United States Patent [19]

Hosokawa

[11] 4,427,266

[45] Jan. 24, 1984

[54] DRIVING SYSTEM FOR MATRIX LIQUID CRYSTAL DISPLAY WITH NONLINEAR-SWITCHES

[75] Inventor: Minoru Hosokawa, Suwa, Japan

[73] Assignee: Kabushiki Kaisha Suwa Seikosha, Tokyo, Japan

[21] Appl. No.: 305,415

[22] Filed: Sep. 24, 1981

[30] Foreign Application Priority Data

Sep. 25, 1980 [JP] Japan ................................ 55-133296

[51] Int. Cl.[3] ................................ G02F 1/133

[52] U.S. Cl. ................................ 350/333; 350/332; 340/785

[58] Field of Search ................................ 350/332, 333, 334; 340/765, 784

[56] References Cited

U.S. PATENT DOCUMENTS

| | | | |
|---|---|---|---|
| 3,654,606 | 4/1972 | Marlowe et al. | 340/166 |
| 3,877,017 | 4/1975 | Kawkami et al. | 350/332 X |
| 4,028,692 | 6/1977 | Ngo | 340/324 |
| 4,062,626 | 12/1977 | Kawakami et al. | |
| 4,198,630 | 4/1980 | Serinken et al. | 350/160 |
| 4,223,308 | 9/1980 | Baraff et al. | 350/334 X |

OTHER PUBLICATIONS

1980 SID International Symposium Digest of Technical Papers, vol. XI.

11/71, Liquid Crystal Matrix Displays, Proceeding of the IEEE, vol. 59, No. 11.

*Primary Examiner*—John K. Corbin
*Assistant Examiner*—David Lewis
*Attorney, Agent, or Firm*—Blum, Kaplan, Friedman, Silberman and Beran

[57] ABSTRACT

The display matrix includes a non-linear element with two terminals connected in series with each liquid crystal element in the matrix panel. The matrix uses generalized AC amplitude selective multiplexing driving voltages. Scanning electrode voltage amplitudes and the data electrode voltage amplitudes are both set up as n:1 where n is a simple integer.

10 Claims, 11 Drawing Figures

DRIVING SYSTEM FOR MATRIX LIQUID CRYSTAL DISPLAY WITH NONLINEAR-SWITCHES

BACKGROUND OF THE INVENTION

This invention relates generally to a matrix type liquid crystal display driving system and more particularly to an active matrix type liquid crystal display driven with a generalized AC amplitude selective multiplexed driving signal. Conventionally, there are three methods for driving a liquid crystal. First, a generalized AC amplitude selective multiplexing driving method is utilized. Secondly, in an active matrix device, a switching transistor is introduced in series with the liquid crystal. Thirdly, in an active matrix apparatus, diodes which have different directional properties are introduced separately and in series with the liquid crystal with the directional properties of the diodes opposed.

However, each of these concepts has its problems. The first concept using the multiplex drive is limited because of the liquid crystal characteristics and it is difficult to actually produce a display having high resolution. In the second concept the transistor switch is formed by a MOS integrated circuit or TFT. The production process has many steps and conditions must be rigidly controlled during production. Therefore, it is difficult with regard to cost to produce a large frame for display using liquid crystals. Regarding the third concept, scanning electrodes are needed in the positive and the negative directions respectively separate. Therefore, the wiring within the panel and the peripheral circuitry is very complicated.

What is needed is an active matrix type liquid crystal display apparatus which has simple circuitry and provides a high contrast, high resolution display.

SUMMARY OF THE INVENTION

Generally speaking, in accordance with the invention, an active matrix type liquid crystal display apparatus having high resolution and simple construction is provided. A method and apparatus for driving a liquid crystal display matrix includes a non-linear element with two terminals connected in series with each liquid crystal element in the matrix panel. The matrix uses generalized AC amplitude selective multiplexing driving voltages. An important factor is the threshold voltage of the non-linear element in relation to the output amplitude of the driving circuit. Additionally, it is important that the scanning electrode voltage amplitudes and the data electrode voltage amplitudes are both set up as n:1, similar to a generalized AC amplitude selective multiplex method of the prior art. Moreover, n is set as a simple integer. As a result, circuit design is simplified and electrode adjustment is easy. The method and apparatus is applicable to a non-linear element in series with the liquid crystal when the non-linear element has a substantial threshold voltage although the threshold voltage is not accurately reproduceable.

Accordingly, it is an object of this invention to provide an improved matrix type display unit using an AC amplitude selective method of driving, and producing a high resolution display.

Another object of this invention is to provide an improved matrix type display unit using an AC amplitude selective multiplexing method of driving and producing a high resolution display wherein the ratio of the scanning and data electrode driving voltages is a simple integer.

A further object of this invention is to provide an improved matrix type display unit using an AC amplitude selective multiplexing method of driving, and producing a high resolution display wherein the voltage generating circuits for driving are simple in construction.

Still another object of this invention is to provide an improved matrix type display unit using an AC amplitude selective multiplexing method of driving wherein a high resolution display is provided by using opposed non-linear elements in series with each display element and by applying driving voltages in a narrow range of values.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

This invention relates to a method and apparatus for driving a matrix type display wherein non-linear active elements are connected in series with each liquid crystal display element. The invention is particularly concerned with the driving voltages for the matrix type display.

The characteristic of contrast in display versus the applied voltage of a liquid crystal is considerably inferior, particularly with regard to threshold voltage characteristics, to other ordinary light emission type display units. Therefore, a liquid crystal is not suitable for the so-called multiplex drive methods. So that the number of scanning electrodes in the matrix is increased to 50 or 100 or more, and to provide a wide range of visual angles, and to have a high contrast in a display unit using TN type liquid crystal, a driving method is mot reliably used which is not dependent only on the threshold voltage of the liquid crystal. Driving is carried out with a material excellent in threshold characteristic connected in series to the liquid crystal.

Figure 1A:
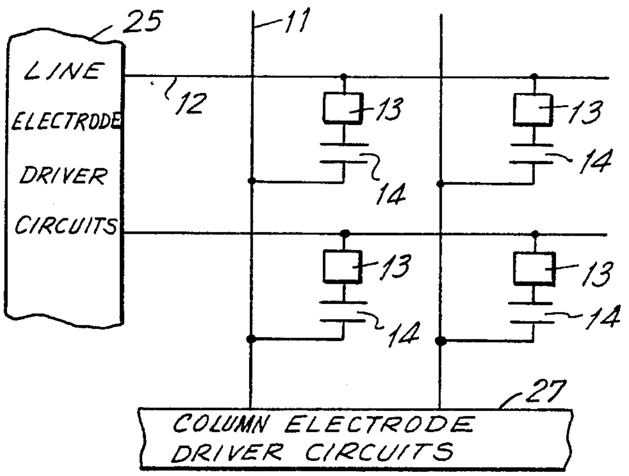
FIG. 1*a* is a partial functional schematic of a matrix type liquid crystal display unit in accordance with this invention.
Figure 1B:
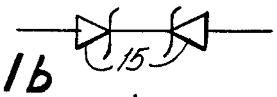
FIG. 1*b* shows non-linear elements applicable for use in the circuit of FIG. 1*a;*

FIG. 1 illustrates one example of a conventional matrix type liquid crystal unit in which a non-linear element is connected in series with the liquid crystal element. The matrix includes column electrodes 11 and line electrodes 12. A line electrode driver circuit 25 and a column electrode driver circuit 27 provide voltage driving signals to the line electrodes 12 and column electrodes 11, respectively. At each of the intersections of the lines and columns, a liquid crystal picture element 14 is connected in series with a non-linear element 13. The non-linear element 13 is, for example, comprised of Zener diodes 15 (FIG. 1*b*) connected back to back. A non-linear element 13 may also be, for examples, a bi-directional varistor or a bi-directional MIM. Also, the element 13 can be formed by connecting ordinary diodes in series.

Figure 2:
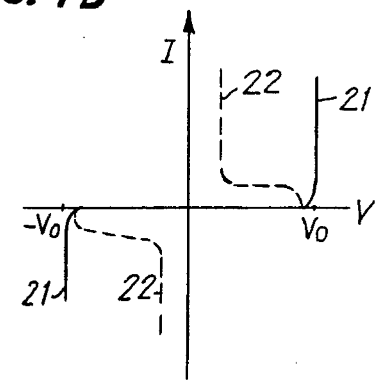
FIG. 2 is the current-voltage characteristics of non-linear elements suitable for use in the circuit of FIG. 1*a;*

It is required that the non-linear element 13 have a symmetrical threshold voltage characteristic as shown in FIG. 2. In general, with a Zener voltage, or a threshold voltage $V_O$, the current of the Zener diode is substantially zero with an applied backward voltage less than $V_O$. The current rises abruptly when the backward voltage exceeds $V_O$. With a forward bias voltage, the Zener diode has the conventional diode characteristic. Therefore, in order to provide a symmetrical voltage-current characteristic as shown in FIG. 2, two Zener diodes are connected in series, that is, back to back, (FIG. 1*b*), so that the polarities are opposite to each other. When Zener diodes are connected in series back to back to each other, a characteristic operating curve 21 is obtained. When a pair of thyristors (not shown) are connected in series back to back a characteristic current-voltage curve 22 is provided. There is an available selection of varistors which provide different characteristic curves. Some varistors show characteristic curves similar to the characteristic 21 of the Zener diodes, and some varistors have characteristic curves which rise gradually with increasing voltage beyond the threshold.

Figure 3:
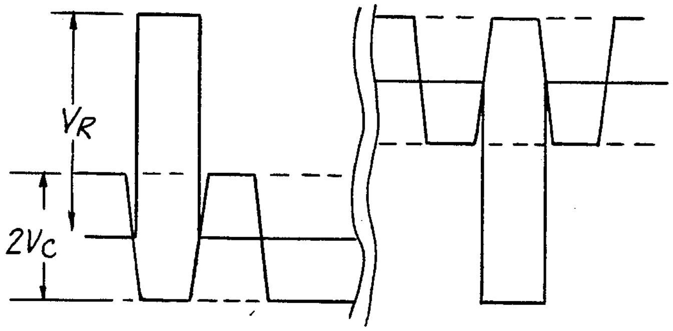
FIG. 3 PRIOR ART
FIG. 3 is an example of prior art drive voltage waveforms usable for driving the matrix of FIG. 1*a;*
Figure 4:
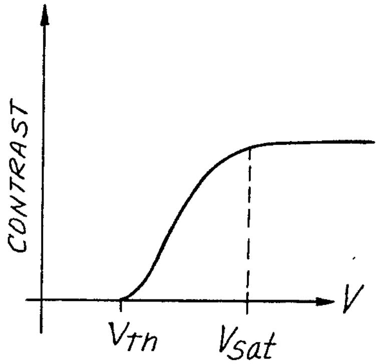
FIG. 4 is the contrast-voltage characteristic of a liquid crystal element.

Heretofore, conditions for driving a matrix display unit of this type have been determined as follows. Let the threshold voltage of the non-linear element 13 be represented by $V_O$; the amplitude of a line electrode scanning signal by $V_R$, with the scanning side as the line electrodes; the amplitude of the column scanning signal by $2V_C$, with the data side as column electrodes; a liquid crystal display element threshold voltage by $V_{Th}$; and the display saturation voltage by $V_{sat}$. Then, let waveforms of the signals applied to the line and column electrodes be as shown in FIG. 3 and let the characteristic curve for the liquid crystal element, that is, applied voltage versus display contrast, be as shown in FIG. 4. The applied voltages are required to satisfy the following three expressions:

$$V_R+V_C \geqq V_O+V_{sat} \quad (1)$$

$$V_R-V_C \leqq V_O+V_{Th} \quad (2)$$

$$V_C \leqq V_O+V_{Th} \quad (3)$$

The expression (1) is the condition of the voltage signals which are applied to a selected picture element which is to be in the ON state. The expression (2) is the condition of the voltage signals which are applied to a selected picture element which is to be in the OFF state. The expression (3) is the condition of the data signals which are always applied to elements in the nonselected condition. When the voltages are set to satisfy the above described three inequalities, then the voltage applied to a picture element liquid crystal in the ON state is higher than $V_{sat}$, and the voltage applied to a picture element liquid crystal in the OFF state is lower than $V_{Th}$. Thus, the driving conditions are satisfied.

However, the display contrast characteristic curve of a TN liquid crystal (FIG. 4) indicates a condition where the liquid crystal element is viewed from a direction perpendicular to the plane of the display unit. The contrast depends greatly on the visual angle. As a result, even with a voltage lower than $V_{Th}$, the orientation of the liquid crystal molecule begins to rise, and when the display surface is observed at a low angle, the display surface appears on the ON state. Accordingly, in practice, in a conventional system operating in accordance with either expression (2) or (3), which define the driving conditions using the value $V_{Th}$ as a threshold value, the display visual angle range is small. Therefore, the display quality is lower than that in a so-called static type display. Additionally, under the conditions defined only by the three above described expressions, the display quality fluctuates depending on the pattern of display data. That is a voltage $(V_R+V_C-V_O)$ applied across the electrodes of a picture element liquid crystal so as to be in the ON state by the scanning signal, is higher than the saturation voltage $V_{sat}$ as is apparent from expression (1). However, the voltage induced across the two terminals of a non-linear element 13 by the terminal voltage $(V_R+V_C-V_O)$, resulting from the charge storage between the liquid crystal electrodes after the application of the scanning signal and by the data signal applied to the data electrode started in succession thereafter, is variable in accordance with the content of the data signal.

When a voltage applied across the terminals of the non-linear element connected to a picture element in the non-selected condition excess $V_O$, then current flows through the non-linear element. Accordingly, the voltage applied to the liquid crystal picture element is decreased. Therefore, in the case where a plurality of picture elements should be placed in an ON state, the display contrast or the visual angle fluctuates between the picture elements in the ON state. This lowers the display quality substantially.

In the driving system for a matrix display in accordance with this invention, the above described degradation in display quality and the fluctuations are eliminated so as to provide a stable display for a liquid crystal display element using non-linear elements in series. Liquid crystal driving conditions are maintained constant. Zero volts is applied to a liquid crystal when the picture element is to be in the OFF state. A voltage higher than $V_{sat}$ is provided for a picture element to be in the ON state. The above expression (2) is modified to:

$$V_R-V_C-V_O \leqq 0 \quad (4)$$

The expression (3) is modified as follows:

$$V_C-V_O \leqq 0 \quad (5)$$

Additionally, for a picture element to be in the ON state without any display fluctuation due to the display pattern, the following condition is present:

$$(V_R+V_C-V_O)+V_C \leq V_O \quad (6)$$

That is, the voltage applied to the non-linear element by the voltage applied across the electrodes of the liquid crystal picture element and by the electric potential of the data electrode, is made to be less than $V_O$. Thus, the non-linear element does not conduct. The expression (6) is rewritten as follows:

$$V_R+2(V_C-V_O) \leq 0 \quad (7)$$

In operating the liquid crystal matrix in accordance with this invention, the expression (1) must be satisfied. When the expressions (4), (5) and (6) are combined with the conditions of expression 1 in place of the expressions (2) and (3), then the drawback of the conventional display, that is the fluctuation in the display quality, is eliminated. The expression (5) is omitted because it is already included in the expression (7).

Figure 5:
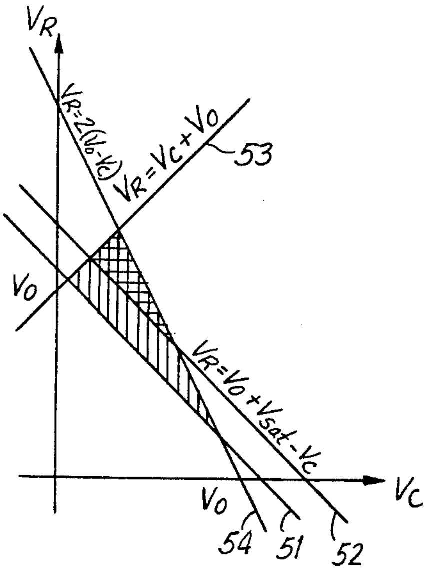
FIG. 5 is a graph indicating suitable driving voltage conditions for the matrix in accordance with this invention.

FIG. 5 is a graphical representation of the above expressions as explained more fully hereinafter. In FIG. 5, the expression (1) is satisfied on or above a straight line 52. The expression (4) is satisfied on or below a straight line 53. The expression (7) is satisfied on or below a straight line 54. A straight line 51 represents the expression $V_R+V_C=V_O+V_{Th}$. That is for the situation where the voltage applied to the picture element to be in an ON state in the selected condition, coincides with the threshold voltage of the picture element $V_{Th}$. In a situation where a liquid crystal element is to be driven with a voltage lower than $V_{sat}$, the amplitude $V_R$ should be above the line 51 instead of above the line 52. Accordingly, the conditions for obtaining uniform display quality with a liquid crystal drive voltage higher than $V_{Th}$, are to set the data electrode voltage $V_R$ and the column electrode $V_C$ in the zone which is surrounded by the lines 51, 53 and 54 of FIG. 5. The conditions for obtaining a uniform display quality with a liquid crystal element drive voltage higher than $V_{sat}$ is obtained by setting the data $V_R$ and $V_C$ in the region which is enclosed by the lines 52,53 and 54 of FIG. 5.

For instance, the coordinates of the intersection of the lines 53 and 54, correspond to the point at which the voltage applied to a liquid crystal is maximum in the ON state. By simultaneous solution of the equations representing the lines 53 and 54, it can be seen that $V_R=4/3 \cdot V_O$, and $V_C=\frac{1}{3} \cdot V_O$.

Figure 6A:
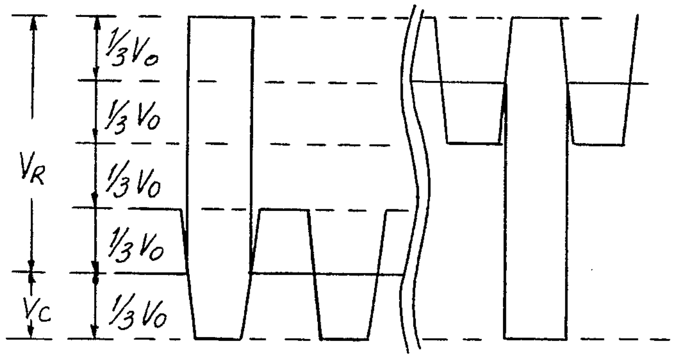
FIGS. 6*a–d* show driving waveforms suitable to drive the matrix in accordance with this invention.
Figure 6B:
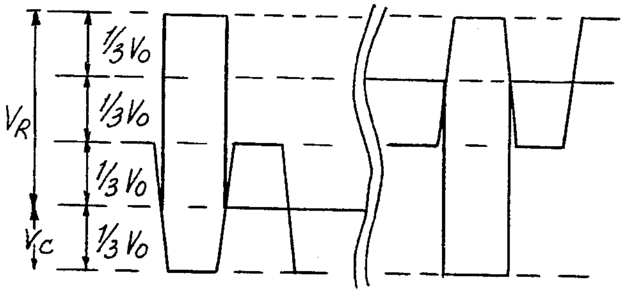
Figure 6C:
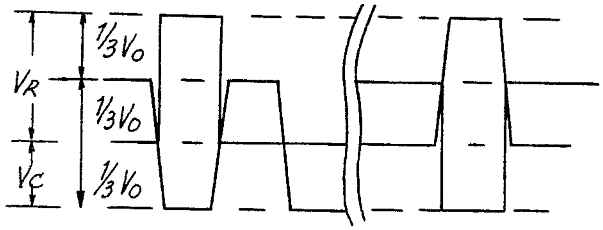
Figure 6D:
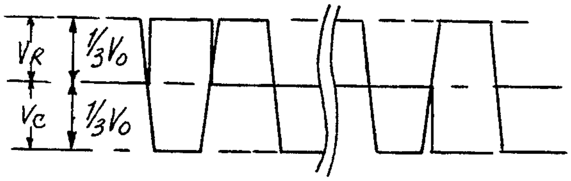

When, in the AC drive of the liquid crystal element, voltage potentials driving the element with opposite polarities are set as indicated in FIG. 6a, there are six potential levels required for the driving voltages and the potential difference between the voltage levels is $\frac{1}{3}$ $V_O$ uniformly. In the prior art, when driving a TN liquid crystal with an effective voltage method, it is necessary to set the potential levels so that the ratio of an effective voltage due to multiplex driving for an ON picture element to the effective voltage for an OFF picture element is maximum. Setting a difference between the potential levels is not easily accomplished. It is necessary to delicately change the potential differences according to the number of scanning electrodes subjected to the multiplex drive. On the other hand, in FIG. 6 the potential levels can be set through a uniform voltage division. FIGS. 6b–d show driving waveforms where the numbers of potential levels are 5, 4 and 3 respectively and the potential difference between the levels is $\frac{1}{3}$ $V_O$ uniformly.

Figure 7:
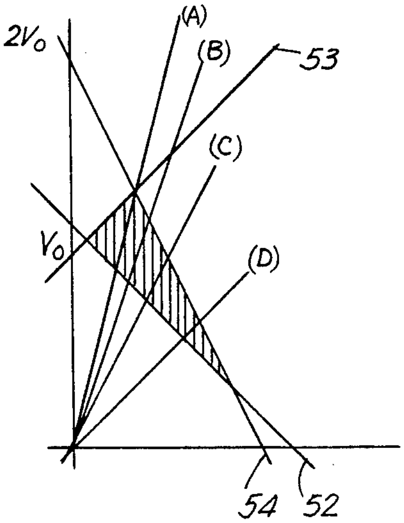
FIG. 7 is similar to FIG. 5 and shows an interrelationship with the waveforms of FIGS. 6*a–d.*

In FIG. 7, lines A, B, C and D represent respectively $V_R=4\ V_C$, $V_R=3\ V_C$, $V_R=2\ V_C$ and $V_R=V_C$. In the range where the straight lines A, B, C and D are within the triangle defined by the straight lines 52, 53 and 54, as discussed with reference to FIG. 5, an operating point on a straight line is selected. Then the potential levels for driving can be set at equal voltage intervals as indicated in FIGS. 6a–d. Insofar as the voltage settings are implemented to satisfy the above described conditions, with anyone of the six potential driving levels, five potential driving levels, four potential driving levels and three potential driving levels of FIGS. 6a–d, a uniform display quality is obtained.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A matrix type liquid crystal display unit, comprising:
   - a plurality of liquid crystal display elements arranged in a matrix format;
   - a non-linear element in series with each of said plurality of liquid crystal display elements, said non-linear element having a current characteristic which is non-linear with respect to applied voltage;
   - column electrodes and line electrodes, each series combination of liquid crystal display element and non-linear element being connected between a column and line electrode;
   - line electrode driving means and column electrode driving means, said driving means being adapted to selectively apply driving signals of a plurality of voltage levels to said line and column electrodes, said voltage levels being applied to select a particular display element for one of OFF and ON states or to non-select said particular element, consecutive ones of said voltage levels being different by equal magnitudes, said non-linear element being non-conducting in said OFF and non-selected states.

2. A matrix type liquid crystal display unit as claimed in claim 1, wherein the quantity of said voltage levels is six.

3. A matrix type liquid crystal display unit as claimed in claim 1, wherein the quantity of said voltage levels is five.

4. A matrix type liquid crystal display unit as claimed in claim 1, wherein the quantity of voltage levels is four.

5. A matrix type liquid crystal display unit as claimed in claim 1, wherein the quantity of said voltage levels is three.

6. A matrix type liquid crystal display unit, comprising:
   - a plurality of liquid crystal display elements arranged in a matrix format;
   - a non-linear element in series with each of said plurality of liquid crystal display elements, said non-linear element having a current characteristic which is non-linear with respect to applied voltage;

column electrodes and line electrodes, each series combination of liquid crystal display element and non-linear element being connected between a column and line electrode;

line electrode driving means and column electrode driving means, said driving means being adapted to apply driving signals to said line and column electrodes, the amplitude of said line driving signals and the amplitude of said column driving signals satisfying the following mathematically expressed relationships $V_R+V_C-V_O \geqq V_{Th}$, whereby a display element is selected and ON, $V_R-V_C-V_O \leqq 0$, where a display element is selected and OFF, $V_R+2\ (V_C-V_O) \leqq 0$, where fluctuation is eliminated, where $V_R$ is the amplitude of said line driving signal; said column driving signal is AC and 2 $V_C$ is said column driving signal; $V_O$ is the threshold voltage of said non-linear element; $V_{Th}$ is the display threshold voltage of said liquid crystal display element; and $V_{sat}$ is the saturation voltage of said liquid crystal display element.

7. A matrix type liquid crystal display unit as claimed in claim 6, wherein the following mathematical expression is satisfied:

$V_R+V_C-V_O \geqq V_{sat}$, whereby uniform quality is provided in the ON state, $V_{sat}$ being the saturation voltage of the liquid crystal display elements.

8. A method for driving a matrix type liquid crystal display unit including a plurality of liquid crystal display elements arranged in a matrix format, a non-linear element in series with each of said plurality of liquid crystal display elements, said non-linear element having a current characteristic which is non-linear with respect to applied voltage, column electrodes and line electrodes, each series combination of liquid crystal display element and non-linear element being connected between a column and line electrode, line electrode driving means and column electrode driving means, comprising the steps:

(a) selectively apply multiplexed driving signals to said column and line electrodes, the amplitudes of said signals being selected to satisfy the following relationships (1) $V_R+V_C-V_O \geqq V_{Th}$, to make an element ON, (2) $V_R+V_C-V_O \geqq 0$, to make an element OFF, (3) $V_R+2(V_C-V_O) \leqq 0$, to avoid quality fluctuation, where $V_R$ is the amplitude of said line driving signal; said column driving signal is AC and 2 $V_C$ is said column driving signal; $V_O$ is the threshold voltage of said non-linear element; and $V_{Th}$ is the display threshold voltage of said liquid crystal display elements.

9. A method as claimed in claim 8, wherein the relationship (a) (1) is replaced by $V_R+V_C-V_O \geqq V_{sat}$, to assure uniform quality and high contrast in display, $V_{sat}$ being the saturation voltage of the liquid crystal elements.

10. A method as claimed in claim 8 or 9, wherein the ratio $V_R/V_C$ is an integer.

* * * * *